UNITED STATES PATENT OFFICE.

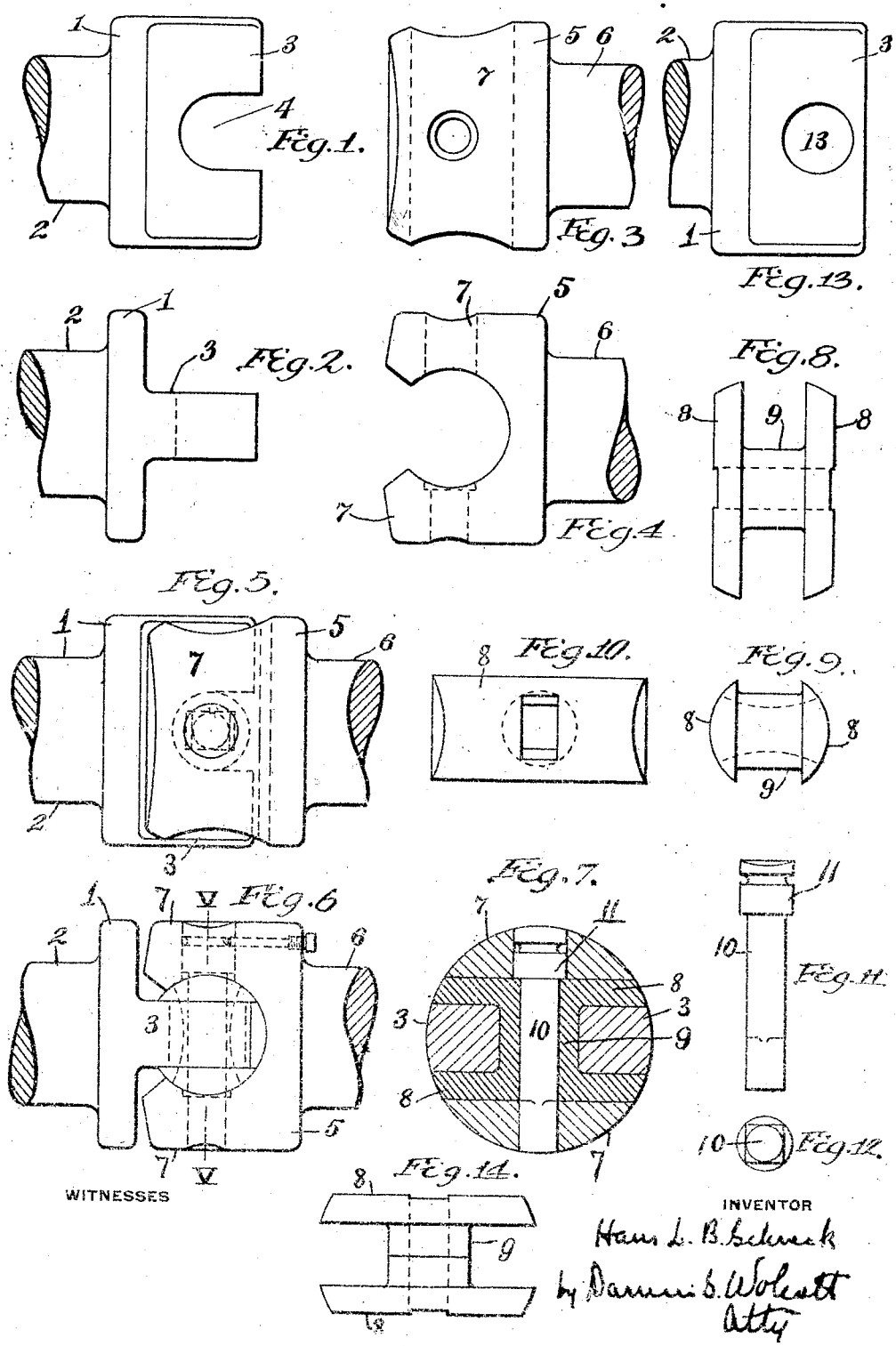

HANS L. B. SCHRECK, OF PITTSBURGH, PENNSYLVANIA.

UNIVERSAL COUPLING.

1,233,612.

Specification of Letters Patent.

Patented July 17, 1917.

Application filed February 14, 1916. Serial No. 78,308.

*To all whom it may concern:*

Be it known that I, HANS L. B. SCHRECK, residing at Pittsburgh, in the county of Allegheny and State of Pennsylvania, a citizen of the United States, have invented or discovered certain new and useful Improvements in Universal Couplings, of which improvements the following is a specification.

The invention described herein relates to certain improvements in universal couplings, and has for its object a construction in which interposed shoes form the bearings between the male and female members for the movement of one to an angular position relative to the other and have a bearing integral therewith for the movement of members at right angles to the first movement and relative, the one to the other. The invention is hereinafter more fully described and claimed.

In the accompanying drawing forming a part of this specification, Figure 1 is an elevation of a male member of the coupling; Fig. 2 is an elevation at right angles to Fig. 1 of the same part; Figs. 3 and 4 are respective views corresponding to Figs. 1 and 2 of the female member of the coupling; Figs. 5 and 6 are elevations at right angles, one to the other of the complete coupling; Fig. 7 is a sectional view, the plane of section being indicated by the line V—V, Fig. 6; Figs. 8, 9 and 10 show the shoes in plan, in end and in side elevation respectively; Fig. 11 shows a side view and Fig. 12 an end view of the holding pin; Fig. 13 is a side elevation of a modification of the male member and Fig. 14 is a plan view of the construction of shoes used in connection with the form of member shown in Fig. 13.

In the practice of the invention, the male member consists of a head or disk 1 formed on one end of a spindle 2 and provided with a rib 3 extending diametrically across the head or disk as shown in Fig. 1, said rib being slotted as at 4 for the reception of a bearing trunnion on which the male member can rock as hereinafter described. The female member consists of a head 5 formed on one end of a spindle 6 and having circularly undercut jaws 7. The curved faces of the jaws form seats for the shoes 8, which have suitably curved outer faces, as shown in Figs. 6, 7 and 8, while the inner faces are flat to bear uniformly on the sides of the rib 3 of the male member. A trunnion 9 is interposed between these shoes which being preferably formed integral with the shoes, will enter the slot in the rib 3 and form a bearing on which the male member will rock. As the rib when constructed with an open ended slot as shown in Fig. 1, will straddle the trunnion 9, the members of the coupling can move apart a substantial distance without becoming disengaged the one from the other.

The shoes are held in position within the female member by means of a pin 10, which is preferably square in cross-section except at its ends, one of which is provided with a head 11 fitting in a recess in one jaw of the female member, while the opposite end is made round and fits snugly in the opposite jaw of the same member. The pin passes through a rectangular oblong opening through the shoes and trunnion, the greater axis of the opening being in the direction of the width of the shoes. The shorter axis or width of this opening is substantially equal to the width of the square portion of the pin. This construction permits of the rocking movements of the shoes on their seats, but prevents any longitudinal movement thereof. If desired, a greater rocking movement of the shoes can be attained by making the walls of the opening in the shoes outwardly flaring from a plane midway of the length of the opening as shown in Figs. 4, 7 and 8.

In cases where a separating movement of the members of the coupling is undesirable or unnecessary, a circular opening 13 is formed through the rib 3 as shown in Fig. 10, and in lieu of forming the shoes and connecting trunnion integral one with the other, the trunnion is divided, the portions thereof being integral with the respective shoes as shown in Fig. 11. When placing the parts of the coupling together, the shoes are placed on opposite sides of the ribs, the portions of the trunnion projecting into the opening 13. The shoes carrying with them the male members of the coupling, are slid longitudinally between the jaws, 7.

It is characteristic of the construction described herein, that motion is transmitted from one member of the coupling to the other through the shoes, which have bearing surfaces of considerable area on both members at all times, regardless of the relative positions of the members and that the trunnion or bearing of the male member is carried by the shoes.

I claim herein as my invention:

1. A universal coupling, having in combination two members, one member being provided with a rib, and the other member with oppositely disposed jaws having their inner surfaces curved, shoes having their outer surfaces convex, adapted to bear on the curved inner surfaces of opposite sides of the jaws and the inner surfaces flat, adapted to bear on the rib on the first mentioned member, said shoes having trunnions extending through an opening in said rib, and means in line with the axis of the trunnion for holding the shoes against longitudinal movement.

2. A universal coupling having in combination two members, one member being provided with a rib, and the other member with oppositely disposed jaws having their inner surfaces curved, shoes having their outer surfaces convex, adapted to bear on the curved inner surfaces of the jaws, and the inner surfaces flat, adapted to bear on opposite sides of the rib of the first mentioned member, said shoes having a hollow trunnion formed integral therewith and extending through a slot in said rib and a bolt passing through the trunnion for holding the shoes in position.

In testimony whereof, I have hereunto set my hand.

HANS L. B. SCHRECK.

Witness:
ALICE A. TRILL.